May 4, 1965  C. B. ADAMS ETAL  3,181,622
PRESS WHEEL
Filed Dec. 31, 1963
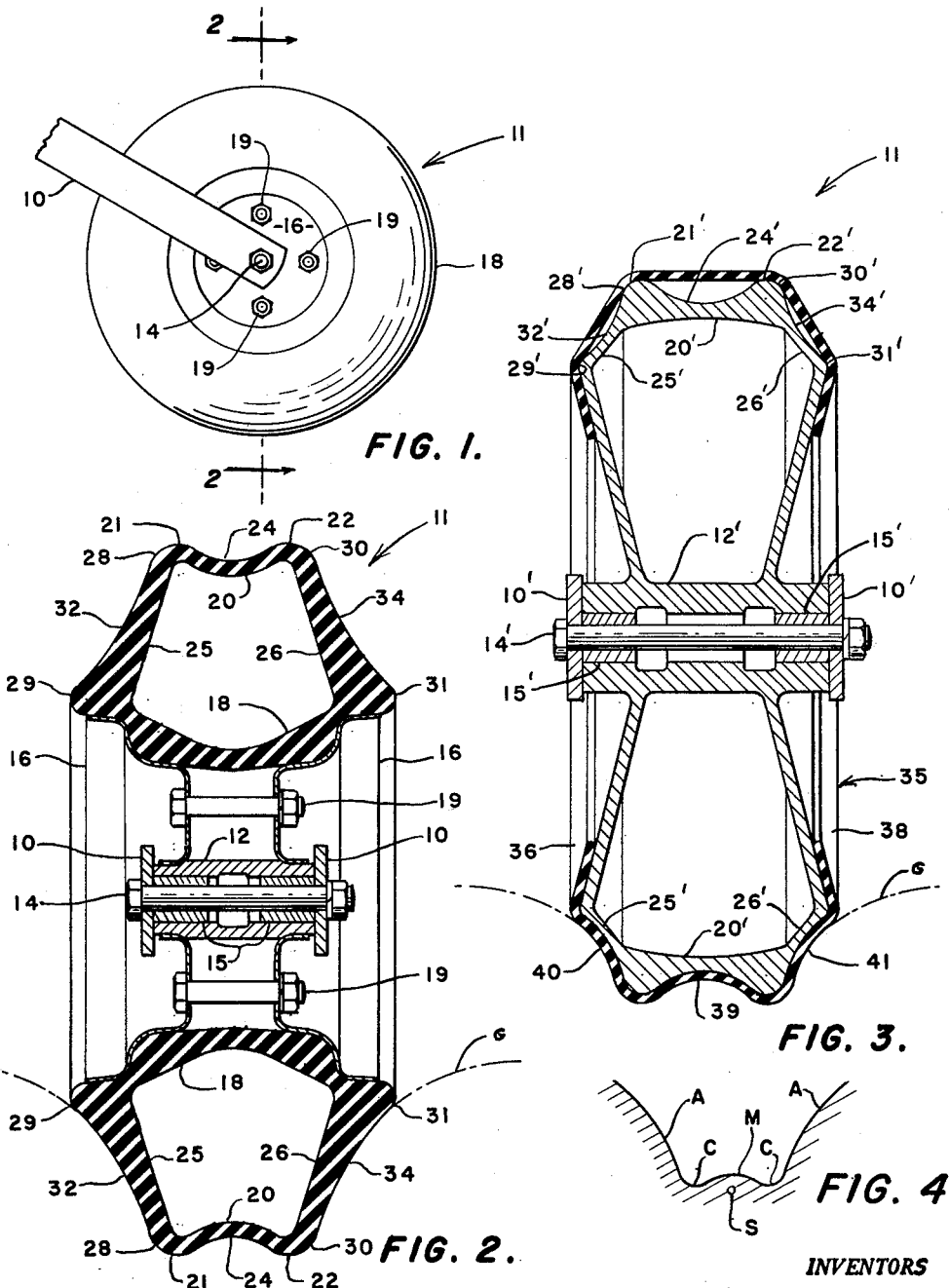
INVENTORS
CHARLES B. ADAMS
& EDWARD A. SILVER
BY *Walter V. Wright*
AGENT 3,181,622
PRESS WHEEL
Charles B. Adams, New Holland, Pa., and Edward A. Silver, Columbus, Ohio, assignors to Sperry Rand Corporation, New Holland, Pa., a corporation of Delaware
Filed Dec. 31, 1963, Ser. No. 334,860
4 Claims. (Cl. 172—519)

This invention relates generally to press wheels for agricultural planters and the like. More specifically, this invention relates to press wheels particularly designed and constructed to be self cleaning and to pack and form a seed furrow in a manner to promote optimum uniform germination of seeds deposited therein.

The use of press wheels on planters to compact soil around and over seeds deposited in the bottom of a seed furrow has been practiced for many years. The purpose of compacting the soil is to promote seed germination by minimizing air pockets thus improving the capillary action of the moisture in the soil as well as reducing wind erosion of the soil over the seed. Present press wheels compress and mold the bottom of the furrow to establish an environment conducive to good germination, but they pay little or no attention to the sides of the furrow. Often, particularly in dry soil conditions, the sides of the furrow cave in as the press wheel passes and the seeds are then covered by random depths of the soil. Movement of the press wheel through the furrow actually promotes collapse of the furrow sides. The sides of the furrows have little resistance to being washed in the first time it rains. The loosened condition of the sides of the furrows provide little resistance to wind erosion as well as to erosion from rain.

It is an object of this invention to provide press wheels for planters and the like which better control the uniformity of the depth of coverage of the soil over the seeds.

It is another object of this invention to provide press wheels for planters and the like which will not cause the sides of the seed furrows to cave in.

It is another object of this invention to provide press wheels for planters and the like which mold the entire seed furrow into a configuration less likely to be destroyed by erosion than conventional furrows.

It is another object of this invention to provide press wheels for planters and the like which mold and pack both the sides and bottom of seed furrows to promote greater resistance to destruction by the elements.

It is another object of this invention to provide press wheels for planters and the like having soil engaging elements which deflect a minimum amount for long service life although enough to be positively self cleaning.

It is another object of this invention to provide press wheels for planters and the like having flexible ground engaging elements which are quickly and easily replaceable.

These and other objects and advantages of this invention will be apparent upon reference to the following description and claims taken in conjunction with the accompanying drawings wherein:

FIG. 1 is a side elevational view of a press wheel constructed in accordance with the principles of the present invention;

FIG. 2 is a sectional view of a press wheel taken on the line 2—2 of FIG. 1;

FIG. 3 is a modified embodiment of the press wheel shown in FIGS 1 and 2; and

FIG. 4 is a diagrammatic illustration of a seed furrow formed and molded by the press wheel of this invention.

Referring to the drawings in detail, the numeral 10 indicates arms which extend downwardly and rearwardly from a conventional planter for the purpose of carrying a press wheel 11. The press wheel 11 is a circular body having a central hub 12 through which a stud 14 extends to provide an axis about which the circular press wheel body rotates. The ends of axle stud 14 are carried respectively by the planter arms 10 as is best seen in FIGS. 2 and 3. The modified embodiment shown in FIG. 3 has many of the same basic elements as the preferred embodiment of FIG. 2. These common elements bear the same, but primed, reference numerals in FIG. 3 as in FIG. 2. A pair of bushings 15 which are readily replaceable when worn, are carried within hub 12. They receive axle stud 14 and serve as bearings for the press wheel.

The body of the press wheel of the preferred embodiment is formed of three major parts, a pair of sheet metal rim-like members 16 and an outer tire-like member 18. A series of studs 19 hold rim members 16 together and serve to clamp tire member 18 therebetween. In the modified embodiment of FIG. 3, the body of the press wheel is cast. It may be cast as an integral unit with hub 12′ as shown, or formed in two or more parts and bolted together. In either embodiment the wheel body has an outer peripheral wall 20 (20′) having axially spaced extremities 21 and 22 of equal and maximum diameter and a concave central portion 24 therebetween. A pair of annular side walls 25 and 26 extend radially inwardly respectively from extremities 21 and 22 of outer wall 20. Side walls 25 and 26 diverge axially as they progress radially inwardly from outer peripheral wall 20. Thus, the outer extremities 28 and 29 of side wall 25 are axially spaced apart as are the outer extremities 30 and 31 of side wall 26. Side wall 25 has a concave outer surface 32 between its extremities 28 and 29, while side wall 26 has a concave outer surface 34 between its extremities 30 and 31. It will be apparent in FIG. 2 that each of the concave outer walls of tire-like member 18 constitutes approximately one third of the total axial dimension of the press wheel while the radial dimension of the side walls is substantially the depth of the seed furrow in which the wheel is intended to be used. Note the ground line G in FIGS. 2 and 3.

In the preferred embodiment, the tire member 18 is made of rubber. No air pressure in excess of the normal atmospheric pressure is carried by tire 18. The portions of the tire walls in engagement with the ground flex slightly inwardly under the weight of the wheel and the downward pressure applied to the wheel by arms 10. When a given portion of the tire rotates up out of engagement with the ground it unflexes, or returns to its preformed configuration, thereby expelling any ground tending to cling to the tire surface. The degree of flexing is slight in comparison to other rubber-tired press wheels, thereby increasing the service life of the tire. The side walls 25 and 26 are formed thicker than outer wall 20 in order that they may support the weight of the wheel with only the minimum amount of flexing necessary to insure self cleaning and to insure the formation of moisture holding channels C (FIG. 4) at the outer edges of the bottom of the seed furrow. The side walls are of maximum thickness at their respective upper extremities 29 and 31 to insure lateral compacting of the soil at the sides of the seed furrow. Thus, in the preferred embodiment of the invention the tire member 18 is contoured and constructed to positively mold and compact both the sides and bottom of a seed furrow.

The modified embodiment of FIG. 3 comprises a rigid cast unit body contoured like tire member 18 in FIG. 2. Obviously, this body will positively mold and compact both the sides and bottom of the seed furrow. It would not be self cleaning, however, in the absence of a resilient cover member 35. Cover member 35 is made up of a plurality of annular portions preferably having different degrees of flexability and durability. The axially outermost annular portions 36 and 38 serve primarily a mounting function. They simply hold member 35 on the cast wheel body. They are preferably made extremely stretchable to facilitate mounting and removing the cover 35 from the wheel body. Durability in resistance to cutting and abrasion is of little concern for these sections. The central annular portion 39 is preferably the least flexible part of the cover member. It must flex sufficiently to move upwardly into contact with concave surface 24' at the bottom of the seed furrow, but it requires very little stretching during the operation of mounting the cover on the wheel. It should also be very durable in resistance to the cutting and abrading action of the soil. The annular portions 40 and 41 between portions 36–39 and 38–39, respectively, must stretch more than portion 39 during mounting but less than portions 36 and 38. Portions 40 and 41 accordingly are preferably made less flexible than portions 36 and 38, but more flexible than portion 39. The requirements concerning durability are less than that of portions 36 and 38. These varying requirements for stretchability, flexibility and durability for the different annular portions of cover 35 may be met by the use of different grades or thicknesses of rubber in the various annular portions of cover 35. The function of cover 35 is obviously to flex upwardly and inwardly against concave surfaces 24', 32' and 34' at the portion of the press wheel in operation on the seed furrow and then to return to a substantially planar form bridging across these concave surfaces as that part of the wheel rotates up out of the furrow thereby cleaning the wheel of clinging soil.

It will be apparent to those skilled in the art that certain synthetics and other known materials may readily be substituted for rubber in the fabrication of tire 18 and cover member 35.

FIG. 4 shows the seed furrow as formed and packed by the press wheel of this invention. Over the seed S is formed a longitudinally extending mound M. The depth of coverage of soil over the seed is uniform from seed to seed. The side walls A of the furrow are packed and formed so as not to cave in. The desirable moisture holding channels C are not filled up by crumbling sides of the seed furrow. The furrow sides A are gently convex and diverge upwardly and outwardly to catch rain without being washed in. The packing of the sides A resists erosion from the wind as well as from rain. Such a seed furrow provides optimum conditions for seed germination as well as uniform conditions from one seed to the next.

While this invention has been described in connection with a particular embodiment thereof, it will be understood that it is capable of modification, and this application is intended to cover any variation, uses, or adaptations, following, in general, the principles of the invention and including such departures from the present disclosure as come within known or customary practice in the art to which the invention pertains, and as fall within the scope of the invention or the limits of the appended claims.

Having thus described our invention, what we claim is:

1. A press wheel for planters and the like to pack and form the bottom and sides of a seed furrow after seeds have been deposited therein comprising a circular body having a central hub providing a horizontally extending axis about which said body rotates, said circular body having an outer peripheral wall generally concentric with said axis, said outer peripheral wall having axially spaced radial extremities of substantially equal diameter relative to said axis and a radially inwardly concave central portion therebetween, the radially outward surface between said axially spaced radial extremities of said outer peripheral wall constituting approximately one third of the total axial dimension of the press wheel, a pair of annular side walls extending radially inwardly and diverging axially from the respective extremities of said outer wall, each of said side walls having axially spaced radial extremities and an inwardly concave outer surface therebetween, the radially outward surface of each of said side walls constituting approximately one third of the total axial dimension of the press wheel, whereby upon rolling of said press wheel through a seed furrow said concave outer peripheral wall of said wheel packs and forms the bottom of said furrow into a convex longitudinally extending mound while the diverging concave side walls of said wheel simultaneously compress the sides of said furrow into upwardly diverging convex forms on opposite sides of said mound.

2. A press wheel for planters and the like as recited in claim 1 wherein the radial dimension of each of said side walls is substantially the same as the depth of a seed furrow in which said wheel is intended for use.

3. A press wheel for planters and the like as recited in claim 1 wherein at least the radially outer portion of said circular body, constituting said outer peripheral wall and said side walls, is made of material having sufficient flexible resiliency to expel ground from the outer surface thereof upon movement of said walls out of engagement with said furrow in response to rotation of said wheel about said axis.

4. A press wheel for planters and the like to pack and form the bottom and sides of a seed furrow after seeds have been deposited therein comprising a circular body having a central hub providing an axis about which said body rotates, said body having an outer peripheral wall generally concentric with said axis and having an outer surface concaved inwardly toward said axis, a pair of annular side walls diverging radially inwardly from the respective axial ends of said outer peripheral wall, said side walls each having a concave outer surface, the radially outward surfaces of said outer peripheral wall and said annular side walls each constituting approximately one third of the total axial dimension of said press wheel.

References Cited by the Examiner
UNITED STATES PATENTS 2,703,517   3/55   Hooper _____ 172—519

T. GRAHAM CRAVER, *Primary Examiner.*